Patented Aug. 9, 1927.

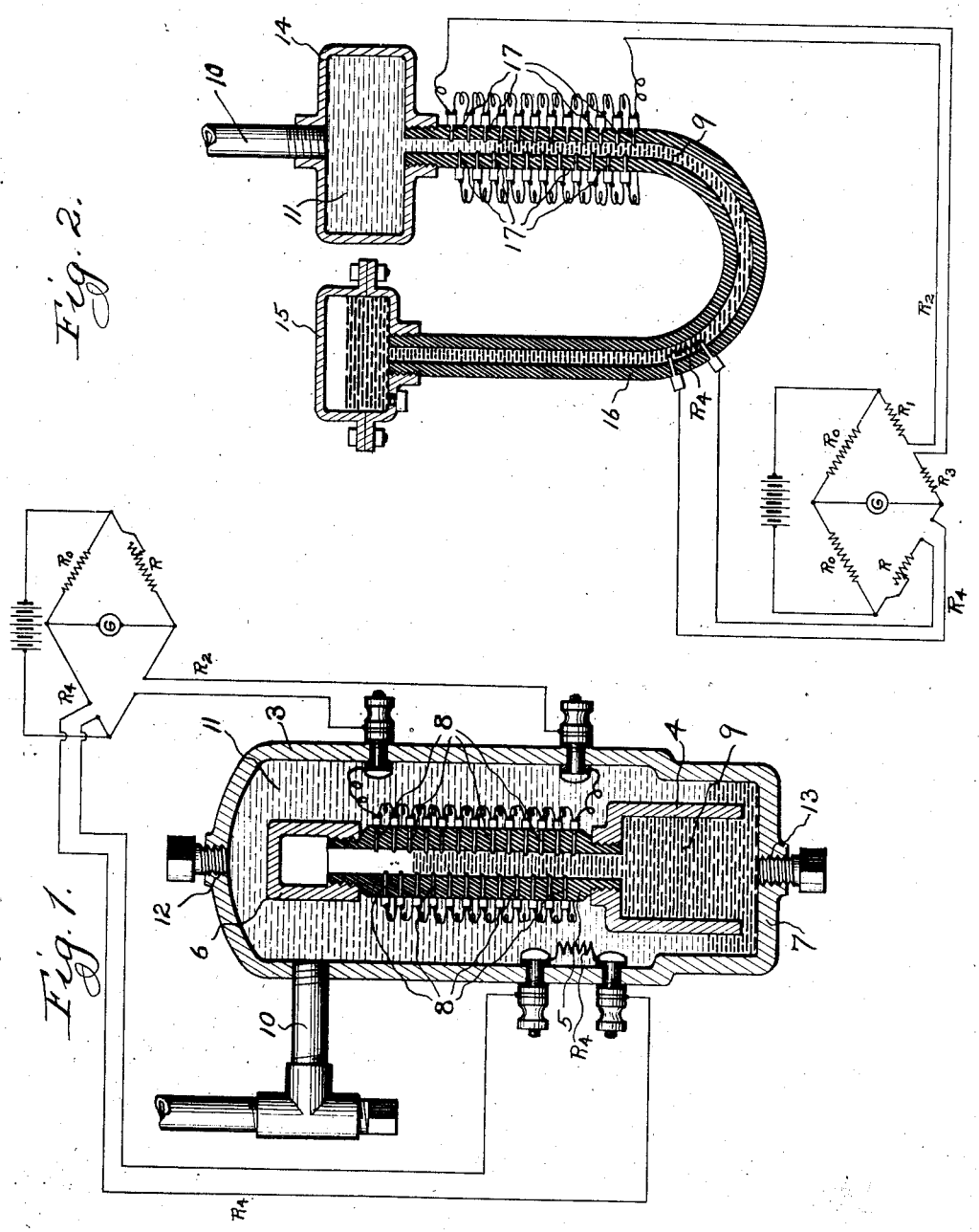

1,638,814

UNITED STATES PATENT OFFICE.

HIRSCH EPSTEIN, OF CHICAGO, ILLINOIS, ASSIGNOR TO HYPERBO-ELECTRIC FLOW METER CO., OF CHICAGO, ILLINOIS, A CORPORATION OF DELAWARE.

ELECTRICAL PRESSURE GAUGE.

Application filed July 3, 1922. Serial No. 572,486.

My invention relates to pressure gauges in which mercury forms electrical connection with a series of resistances and the objects of my improvements are, first, to accurately obtain the desired pressure at all times as the pressure changes; second, to provide a gauge by means of which any desired condition of combinations of factors may be obtained; third, to enable the insertion or connection of resistances varied by and measuring the pressure under different conditions; fourth, to enable the insertion of resistances for correction purposes; fifth, to so construct the device that leakage will be prevented; sixth, to make a simple, practical and durable device, and other features to become apparent from the description to follow:

My invention comprises a pressure chamber, an air chamber and a suitable tube or pipe connecting the two. The connections between the tube or pipe and the pressure and air chamber are screw-threaded and sealed so that there is no possibility of leakage. The tube or pipe is provided with a series of electrical contacts arranged at different points along its length, preferably at graduated distances apart, which contacts are connected with suitable resistances. A quantity of mercury within said tube or pipe is confined between the pressure in the pressure chamber and the pressure in the air chamber and its position within said tube is varied by the varying pressure so that the pressure determines what amount of resistance is connected in the circuit. The resistances of the series connected to the plurality of contacts are predetermined with respect to the pressure, preferably according to a definite graduation, so that by ascertaining the quantity of resistance in the circuit the pressure is attained. The resistance is measured by placing a balancing resistance in a Wheatstone bridge, in one leg of which are connected the resistances of the pressure gauge. The pressure within the gauge is at times varied by the varying temperature of the air in the air chamber, or by other phenomena, and to provide a correction for this a suitable resistance located in the air chamber is connected in the circuit of the proper leg of the Wheatstone bridge.

To describe my invention so that others versed in the art to which it pertains can make and use the same, I have illustrated it on the accompanying sheet of drawing forming a part of this specification and in which:

Figure 1, is a vertical central sectional view of a pressure gauge embodying my invention in its preferred form, diagrammatically connected in one leg of a Wheatstone bridge, and Figure 2, is a similar view showing a modification diagrammatically connected in one leg of a logarithmic Wheatstone bridge.

Similar reference characters refer to similar parts throughout both views.

Referring to Figure 1, within the outer metal shell, or container, 3, is secured a tube or well, 4, surmounted by a smaller tube, 5, made of any desirable electrical insulating material. To the upper end of the tube, 5, is secured a cap, 6, made in the form of an air chamber. The lower end of the tube or well, 4, is open and terminates a short distance above the bottom, 7, of container, 3, forming an annular space between the tube, 4, and lower end of the container, 3. Piercing the tube, 5, and extending from its exterior to its interior are a plurality of contact pins, 8, arranged in a graduated manner from the bottom to the top of the tube, 5. Suitable resistances are connected between the contacts, 8, in series, so that as different contacts are electrically connected and disconnected to the mercury, 9, within tube, 5, by the rise and fall of said mercury, the changes in the total resistance can be measured in any suitable manner.

A suitable quantity of mercury, 9, is provided in the lower end of container, 3, and the tubes, 4, and 5. The fluid pressure is admitted through a suitable pipe connection, 10, to the interior of the container, 3, and of course is exerted against the mercury, 9, in tubes, 4, and 5, and against the air in the air chamber, 6. Obviosuly a greater or less pressure within the container, 3, will force the mercury, 9, up into the tube, 5, a greater or less distance, and the top end of the tube, 5, being closed by the air chamber, 6, the air confined in said chamber will therefore be compressed to a greater or less degree as the mercury moves up and down in said tube, 5. I prefer to fill the vacant portion of the container, 3, with electrical insulating oil, 11, heavier than water, to prevent short circuiting of the contacts, 8, through moisture which may otherwise accumulate in the container, 3.

The top of the container, 3, is provided with an opening, 12, normally closed by a plug, for the purpose of placing the required amount of mercury, 9, and oil, 11, into the same. Another opening, 13, normally closed by a plug, is provided in the bottom, 7, of container, 3, for the purpose of removing the mercury, 9, and oil, 11, when it becomes necessary for repairs or other purposes. It will be noted that the same pressure exists within tube, 5, as in the container, 3, so that there is no tendency for any leakage from within the tube, 5, into the container, 3.

As above mentioned, when the mercury, 9, rises in tube, 5, the amount of resistance between the extreme contacts, 8, will be reduced and when the mercury, 9, falls in tube, 5, the amount of resistance between the extreme contacts, 8, will be increased, and to measure the amount of this resistance the extreme contacts, 8, are connected by suitable conductors in series in one arm of a Wheatstone bridge, the said resistance being designated as $R_2$, the resistance connected in the companion arm being designated as $R_4$. The resistance $R_o$ is connected in one arm on the opposite side of the galvanometer and the balancing resistance R is connected in the companion arm thereto.

In the construction shown in Figure 1, above described, when the pressure gauge air temperature, i. e., the air in the air chamber 6, rises, the air will expand and depress the mercury in tube 5, thereby increasing the resistance, $R_2$, between the extreme contacts 8.

To make correction for this increased resistance, the resistance $R_4$ in the companion arm is also increased to the proper extent, which will leave the balancing resistance R, which measures the pressure, unchanged by the temperature increase. This is done by using for $R_4$ a resistance which rises with temperature.

To find the relation between the applied pressure, P, and the resultant pressure in the air chamber, $P_1$, and the air temperature, $T_p$, we note that an increase in the air chamber pressure, $P_1$, can only result from a proportional increase in the applied pressure, P; and if for any given case we also increase the air chamber temperature, $T_p$, it is evident that the increased pressure in the air chamber will have to be balanced by an increase in the applied pressure, P, in order that the mercury level in the air chamber should remain where it was before the temperature was increased; in other words, the applied pressure, P, must increase directly in proportion to the air chamber pressure, $P_1$, and the air chamber absolute temperature, $T_p$. Therefore, we may write:

$$P \propto P_1 T_p \quad (Eq. \#1.)$$

The relationship between the resistances of Figure 1, and the elements they measure is as follows:

$$R_2 = \frac{K_2}{P_1}$$
$$R_4 = K_4 T_p$$
$$\frac{R}{R_2} = \frac{R_o}{R_4} \text{ or } R = R_2 \frac{R_o}{R_4} =$$
$$\frac{K_2 R_o}{P_1 K_4 T_p} = \frac{K_2 R_o}{K_4} \frac{1}{P_1 T_p} =$$
$$\frac{K_o}{P_1 T_p} = \frac{K_1}{P}, \text{ since } P \propto P_1 T_p.$$

(See Eq. #1) where R, $R_o$, $R_2$, and $R_4$, = resistances $K_o$, $K_4$, $K_2$, $K_4$ = constants of proportionality.

P = absolute pressure of gas in pounds per square foot.

$P_1$ = effective pressure in the air chamber.
$T_p$ = pressure gauge temperature.

In Figure 2, I have illustrated a modified form of my invention in which the pressure container 14 and the air container 15 are connected by a U shaped tube 16 made of any desirable electrical insulating material which has the plurality of contacts 17 piercing it on the leg below the container 14. The contacts 17 are exposed to the interior of the tube 16, are arranged in a graduated manner on different levels and are connected by suitable resistances as described in connection with Figure 1. The container 14 is preferably filled with electrical insulating oil 11, and a suitable quantity of mercury, 9, is placed in the tube, 16.

It will be noted that in the construction shown in Figure 1, as the pressure increases, additional resistances are cut out of the circuit while in the construction shown in Figure 2, as the pressure increases additional resistances are connected into the circuit. In each case, however, there is a relatively definite variance of resistance for a given change of pressure, and by measuring the effective resistance the desired pressure is ascertained.

As above referred to, when the mercury 9 falls in the leg of tube 16, under the chamber 14, due to increased pressure in said chamber, the amount of resistance between the extreme contacts 17, will be increased and when the mercury 9, rises, due to less pressure, the amount of resistance between the extreme contacts, 17, will be decreased, and to measure the amount of this resistance, the extreme contacts, 17, are connected by suitable conductors in series in one arm of a logarithmic Wheatstone bridge, such as is disclosed in the patent to Julius M.

Naiman for Logarithmic resistance circuit for measuring combinations of different factors, issued February 23, 1926, Patent No. 1,573,850, the said resistance being designated as $R_2$, the resistance connected in the companion arm being designated as $R_0$. A resistance $R_0$ is connected in one arm on the opposite side of the galvanometer and the balancing resistance R is connected in the companion arm thereto.

In the construction shown in Figure 2, last above described, when the pressure guage air temperature, i. e., the air in the air chamber 15, rises, the air will expand and depress the mercury in the leg of tub 16 under chamber 15 which will cause the mercury in the leg under chamber 14 to rise, thereby decreasing the resistance $R_2$ between the extreme contacts 17. To make correction for this decreased resistance, the resistance $R_4$ is connected in the arm with the balancing resistance R to increase the total resistance in said arm to the proper extent which will leave the balancing resistance R, which measures the pressure, unchanged by the temperature increase. This is done by using for $R_4$ a resistance which rises with temperature.

I have also illustrated in Figure 2 how pressure in combination with other factors can be ascertained, giving for example the combination of factors necessary for measuring flow of gas, which requires that the resistances $R_1$ and $R_3$ be connected in the same arm with the resistance $R_2$.

To measure the flow of gas it is necessary to ascertain the values of three variables, to-wit, the rate of flow of the gas past a given point, the pressure of the gas thus flowing, and the specific gravity of the gas, with respect to air. Hence, in order to measure such flow, I make the resistances $R_1$, $R_2$ and $R_3$ proportional respectively to said variables.

The relationships between the elements involved in Figure 2 are:

$$R_2 = K_o \log_a C_2 P$$
$$R_1 = K_o \log_a C_1 p_d$$
$$R_3 = K_o = \log_a \frac{C_3}{S}$$
$$R_4 = K_o \log_a C_4 T$$
$$\frac{RO}{RO} = \frac{R + R_4}{R_3 + R_2 + R_1} = 1$$

$$R = R_1 + R_2 + R_3 - R_4 = K_o \log_a C_1 p_d + K_o \log_a C_2 P + K_o \log_a \frac{C_3}{S} - K_o \log_a C_4 T = K_o \log_a$$

$$\frac{C_1 \, p_d}{S} \cdot \frac{C_2 P C_3}{C_4 T} = K_o \log_a \frac{C_1 C_2 C_3}{C_4} \frac{p_d P}{S T} = K_o \log_a$$

$$C_o \frac{p_d P}{ST} \text{ where}$$

R, $R_1$, $R_2$, $R_3$ and $R_4$ = resistances.

$C_1$, $C_2$, $C_3$, $C_4$ are constants of proportionality.

$K_o$ = resistance calibration constant.
P = absolute pressure of gas in pounds per square foot.
$p_d$ = pressure difference, pounds per square foot.
S = specific gravity of gas with reference to air.
T = absolute temperature of gas °F.

The balancing resistance R may be automatically changed and the change may be indicated by a pointer measuring the balancing resistance, by means of a galvanometer relay similar to that shown in the patent to Obermaier No. 1,376,633 of May 3, 1921.

It will be understood that the size, form and arrangement of the parts may be varied without in the least departing from the scope of my invention.

Having thus fully described my invention, what I claim as new and desire to secure by Letters Patent of the United States is:

1. In a pressure measuring device, the combination of a closed gas chamber having a gas trapped therein, a pressure chamber enveloping said gas chamber and connected therewith, means for imposing the pressure to be measured upon the gas trapped in said gas chamber, and means including a first resistance responsive to the volume of the trapped gas and a second resistance disposed in the enveloping pressure chamber and varying with the temperature of the trapped gas and electrically connected with said first resistance for electrically determining the pressure to be measured as a combined mathematical function of the temperature and volume of the trapped gas.

2. In a precision instrument for measuring pressures, the combination of a closed gas chamber having a gas trapped therein, a pressure chamber enveloping said gas chamber and connected therewith, means for imposing the pressure to be measured upon the gas trapped in said gas chamber, a Wheatstone bridge containing a pair of proportionality resistances in one pair of its arms, an adjustable balancing resistance in one of the other arms, a resistance varying as a function of the volume of the trapped gas in the other arm, a resistance varying inversely with respect to said last resistance and as a function of the temperature of the trapped gas disposed in the enveloping pressure chamber and connected in series with the adjustable balancing resistance and in the balancing resistance arm, said last resistance being balanced against the resistance which varies as a function of the volume of the trapped gas, and a cross connection for the bridge, said balancing resistance measuring pressures imposed upon the trapped gas as combined mathematical functions of the temperature and volume of the trapped gas.

3. In a precision instrument for measuring pressures, the combination of a closed gas chamber having a gas trapped therein, a pressure chamber enveloping said gas chamber and connected therewith, means for imposing the pressure to be measured upon the gas trapped in said gas chamber, a Wheatstone bridge containing a pair of proportionality resistances in one pair of its arms, an adjustable balancing resistance in one of the other arms, a resistance varying as a function of the volume of the trapped gas in the other arm, a resistance varying inversely with respect to said last resistance and as a function of the temperature of the trapped gas connected in series with the adjustable balancing resistance and in the balancing resistance arm, said last resistance being balanced against the resistance which varies as a function of the volume of the trapped gas, and a cross connection for the bridge, said balancing resistance measuring pressures imposed upon the trapped gas as combined mathematical functions of the temperature and volume of the trapped gas.

In testimony whereof I have signed my name to this specification this 17th day of June, 1922 at Chicago, Illinois.

HIRSCH EPSTEIN.